United States Patent [19]

La Combe

[11] 3,816,196

[45] June 11, 1974

[54] PASSIVATION OF PHOTORESIST MATERIALS USED IN SELECTIVE PLASMA ETCHING

[75] Inventor: Donald J. La Combe, De Witt, N.Y.

[73] Assignee: General Electric Company, Syracuse, N.Y.

[22] Filed: June 7, 1971

[21] Appl. No.: 150,503

[52] U.S. Cl. .......................... 156/8, 156/2, 204/164, 204/312

[51] Int. Cl. .............................................. B44c 1/22

[58] Field of Search ............. 156/2, 8, 16; 204/192, 204/164, 312

[56] References Cited

OTHER PUBLICATIONS

R–F Sputtering Process by Vossen and O'Neil, pp. 149 and 176, RCA Review, Vol. 29, No. 2, June 1968, Articles pp. 149–176.

*Primary Examiner*—William A. Powell

*Attorney, Agent, or Firm*—Richard V. Lang; Carl W. Baker; Frank L. Heuhauser

[57] ABSTRACT

A method is disclosed for selective plasma etching of organic material by means of a low temperature plasma which reacts with the organic material through an apertured mask overlaying said material. The method has particular application to electronic circuit fabrication. A preferred organic dielectric material is a polymer of fluorinated ethylene propylene and a suitable mask for plasma etching of this material is a photoresist composition, which has been passivated to be resistant to attack by the plasma.

4 Claims, 5 Drawing Figures

PATENTED JUN 11 1974

3,816,196

INVENTORS:
DONALD J. LaCOMBE,
GUY L. BABCOCK,
BY Marvin L. Goldenberg
THEIR ATTORNEY.

PASSIVATION OF PHOTORESIST MATERIALS USED IN SELECTIVE PLASMA ETCHING

The present application is being filed concurrently with application Ser. No. 150,504 filed June 7, 1971 in the names of D. J. LaCombe and G. L. Babcock. This joint application was a continuation in part of an earlier joint application by the same inventors filed on Sept. 23, 1969, Ser. No. 859,870, now abandoned.

BACKGROUND OF THE INVENTION:

1. Field of the Invention:

The invention relates to the field of plasma decomposition of organic materials, and more specifically to the use of plasmas in the processing of electronic circuit components.

2. Description of the Prior Art

Plasmas have been employed in sample analysis for reducing materials of various compositions into an inorganic residue. In this process, a reaction of a material's organic constituents is performed at relatively low temperatures forming gaseous products but leaving intact and unaffected the inorganic constitutents for subsequent elemental analysis. More recently, plasma reaction has been employed in semiconductor processing, for the gross removal of photoresist material from a surface after etching. In certain of these prior art devices, appreciable energy is coupled to the plasma, on the order of several hundred to several thousand watts, which heats the organic samples to on the order of 100°C to 500°C.

SUMMARY OF THE INVENTION:

It is a principal object of the invention to provide a novel method for selectively plasma etching organic material.

It is a further object of the invention to provide a novel method for plasma etching an organic layer in an electronic circuit.

It is another object of the invention to provide a novel method for selectively plasma etching a fluorinated polymer.

It is still another object of the invention to provide a novel method for selectively plasma etching a fluorinated polymer for use of a mask of photoresist, which mask is passivated against attack by the plasma.

These and other objects of the invention are accomplished in a low temperature plasma generating system which includes a plasma reaction chamber within which is mounted an organic sample to be plasma etched. Overlaying the surface of the organic material is an apertured mask of photoresist. The photoresist is of a material which is initially more resistant to plasma attack than the underlying organic material. A flow of gas at a pressure in the range of from 60 to 100 microns of mercury is provided over the sample for approximately ten minutes until the surface of the resist exhibits its darkening at the surface and the weight of the photoresist is stabilized. By this method, the mask becomes passivated against further attack by the plasma. Thereafter the gas may be increased in pressure to from 100 to 300 microns of mercury and the plasma acts to selectively etch the underlying organic material through the apertures of the passivated mask. A preferred underlying organic material is a fluorinated polymer such as fluorinated ethylene propylene. A preferred masking material is a negative dry film photoresist. Both negative and positive photoresists may be used.

BRIEF DESCRIPTION OF THE DRAWING:

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

Figure 1:
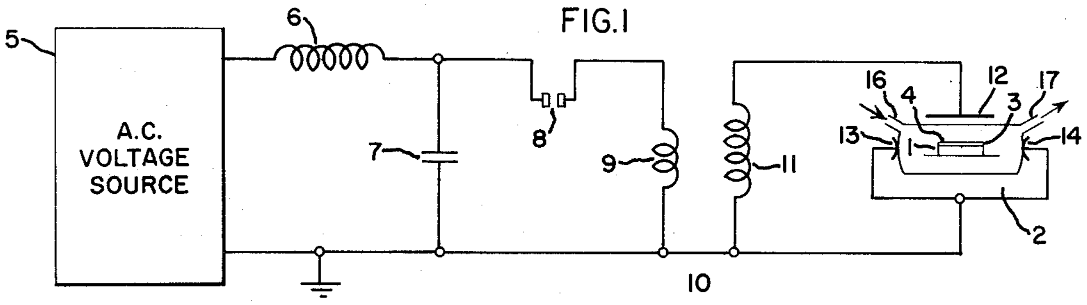
FIG. 1 is a schematic diagram of a plasma generating system.

DESCRIPTION OF THE PREFERRED EMBODIMENTS:

In FIG. 1 there is illustrated a schematic diagram of a high frequency plasma generating system which is employed to selectively plasma etch the organic material of a body member 1 mounted in a plasma reaction chamber 2. A Tesla coil arrangement is employed to generate a plasma within the chamber 2. The organic material of member 1 consists of a cover layer 3 and has an apertured mask 4 deposited on the supper surface. The body member 1 is shown in greater detail in FIGS. 2A and 2B, to be considered presently. In the system of FIG. 1 a low temperature plasma is generated principally in the region above the body member 1 which selectively etches the organic layer 3 through the apertured mask 4.

The Tesla coil arrangement, which is per se a conventional circuit, includes an a.c. voltage source 5, one terminal of which is connected to ground, and the other terminal connected through an inductor 6 and a capacitor 7 to ground. The junction of inductor 6 and capacitor 7 is connected through an interruptor 8 having a pair of contacts to one terminal of a primary winding 9 of a resonator coil 10, the other terminal of which is connected to ground. The effective opening and closing of the interruptor contacts are controlled by the inductor 6. A secondary winding 11 of the resonator coil 10 has one terminal connected to ground and the opposite terminal connected to a broad electrode 12. The turns ratio of the secondary winding 11 to the primary winding 9 is very large, e.g., in the order of 50:1. The inductance of the winding 11 resonates with the stray capacitance of the winding for generating an extremely high magnitude alternating voltage, in the order of 50 to 100 KV at a frequency of several MHz.

Figures 3, 4:
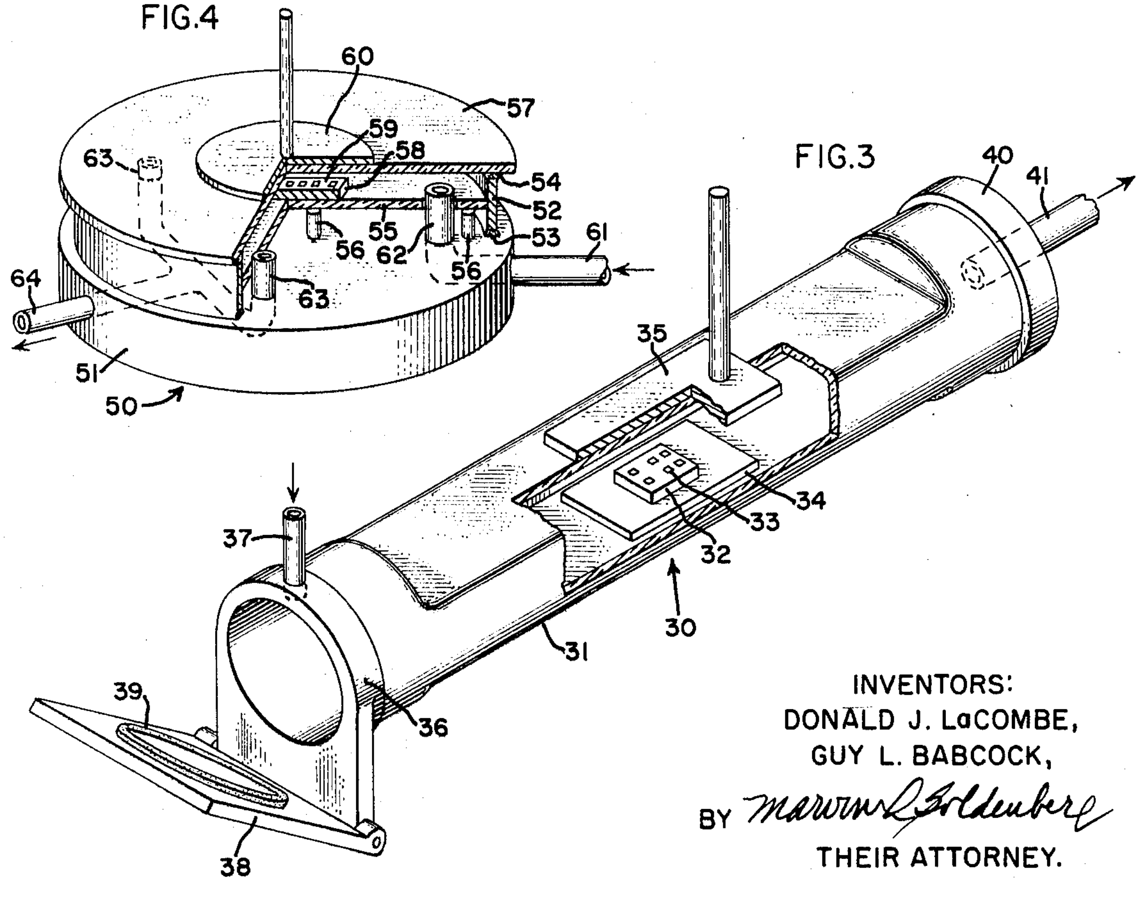
FIG. 3 is a perspective view of one embodiment of a plasma reaction chamber that may be employed in the system of FIG. 1.

Electrode 12 is shown adjacent to the chamber 2 and in parallel with the masked surface of the organic layer 3. In alternative configurations, the electrode 12 may be in contact with the chamber wall or made to extend within the chamber. Further electrodes 13 and 14 having a common ground connection are at either side of the chamber 2 contiguous with the side walls. For purposes of illustration, electrodes 13 and 14 are shown as a pair of discrete elements. However, as will be described in greater detail when considering the plasma reaction structures of FIGS. 3 and 4, these electrodes are constructed as integral portions of the walls of the reaction chamber, and in the embodiment of FIG. 4 are a single element. The alternating electric field generated by the secondary winding 11 is coupled to the plasma reaction chamber 2 by means of the electrodes 12, 13 and 14.

When sputtering of the electrode material onto the organic layer 3 is to be avoided, the electrode 12 in proximity to the layer 3 should be protected from exposure to the plasma by an insulating layer. This may either be accomplished by placing the electrode on the outside surface of the upper wall of the chamber, as illustrated, or by introducing the electrode within the vacuum chamber but providing an intervening insulating layer. Besides preventing sputtering, an insulating layer introduced between the electrode 12 and the plasma has the additional benefit of introducing a capacitive impedance in series with the relatively low impedance plasma. This added capacitive impedance prevents surface mismatch between the power source and the discharge. If serious mismatch should occur, the power may be reflected back into the power source and not properly absorbed by the plasma.

A flow of gas is provided in the upper region of the chamber 2 around the body member 1, the gas being admitted through an input port 16 and exhausted through an output port 17. The gas is at reduced pressure, normally from 70 to 300 microns of Hg. The gas is broken down by the applied electric field so as to generate an intense plasma which reacts with the organic material. A suitable gas is oxygen.

The generation of a plasma is a well known phenomenon wherein free electrons of the gas under the action of the large high frequency electric field absorb energy and through successive collisions release additional electrons and ions. The action is multiplied many times until a steady state condition is reached through recombination. In the process, the gas is ionized with neutral electrical charge, which is the plasma. The reduced pressure of the gas increases the mean free path of the electrons and thereby facilitates the plasma generation. The plasma generally fills the region between the broad electrode 12 and the electrodes 13 and 14, but the active gaseous species tend to concentrate in the regions in proximity to the electrodes. Through the employment of the described apparatus for generating a large magnitude electric field and the geometry of the electrodes which provide a region above the body member 1 having the largest concentrations of active gaseous species, the plasma etch process can be efficiently performed with low power input, in the order of 30 to 60 watts or less. The generated plasma is of low temperature and has a minimum heating effect upon the body member. The plasma is found to be specific in the etching of differently composed organic materials.

Increased plasma etching activity in the vicinity of the electrodes has been experimentally verified. Experimentation has shown that at a given pressure of gas, maximum etching occurs at a point where the sample surface is approximately an electronic mean-free path from the surface of the chamber adjacent the electrode. The etch rate characteristic changes quite rapidly with distance, a 50 percent variation in distance from optimum reducing the etch rate 20 – 30 percent.

An explanation for this dependence of etching rate upon sample position is believed to arise from the mechanisms described above. When the RF field is established, accelerated electrons collide with gas molecules ionizing the gas and forming ionized species which make up the plasma. The evacuated region thereupon tends to fill with plasma except in close proximity to the electrode of momentarily negative potential.

A virtual boundary to the plasma exists in the region of the momentarily negative electrode. This is attributable to the fact that the electrons must travel a finite distance in the electric field before an ionizing collision with a gas molecule can be expected. The region within one electron mean free path of the electrode is the place where the plasma and its component active species are created. This region then contains the highest density of active gaseous species. In the remainder of the space between the electrodes, the density of active species falls off through recombination. Their presence is evidenced by a diffused glow throughout the vacuum chamber. The densities of active species affect the electric field distribution within the vacuum chamber, their conductivity tending to form a low impedance path coextensive with the plasma. This low impedance reduces the electric field within the plasma and concentrates the applied high voltage field at the plasma boundary. The strong field at the boundary increases the local population of high velocity electrons whose collisions produce active gaseous species and thus stabilize the site for the creation of the greatest number of active species in this region. Because the excitation is of an a.c. nature, conditions for the creation of active species are re-established in the vicnity of the planar electrode 12 during one phase of each cycle.

The active species which are normally present in the plasma are different forms of oxygen including (O), $O_2$ and $O_3$ at several levels of ionization and excitation. In addition, the plasma contains the reaction products arising from the etching process. The gaseous species contributing most to the etching process appears to be monatomic oxygen (O). One may employ other known gaseous elements. Oxygen works well and the reaction products formed are readily removed.

The foregoing optimization of sample position is premised upon a prior selection of the pressure within the vacuum chamber. Experience has shown that the etching rate is unnecessarily slow at pressures below 70 microns of mercury and that the etching rate increases quite rapidly as one increases the pressure to about 300 microns. At above 300 microns of mercury, one finds the gap (.070 inches), required to optimize the rate, to be too small. At this distance, a sample tends to vibrate in the field, or to adhere to the wall of the chamber. In general, mechanical reasons make the etching harder to control at higher pressures. A practical upper working limit appears to be at about 300 microns pressure.

In addition, a second factor takes place at pressures in excess of 100 microns. This is the tendency of certain organic masking materials to be etched along with the organic layer 3, thus reducing the etching specificity. In the case where a customary (unpassivated) photoresist is employed as the mask 4, the preferred pressure is in the vicinity of 100 microns. Within a photoresist passivated (in the manner to be described below) one may select a higher pressure. While other masking materials may permit higher pressure limits than 100 mm, none appear to permit operation above a practical upper limit of 300 microns.

Thus, when the conditions are optimized as set forth above, the etching of the sample proceeds in highly efficient and accurate manner. The etching process produces minimal sample heating. Sample temperatures rarely exceed 100° – 300°C, and most frequently are only slightly warmed above room temperatures. In any event, the temperatures are well below those that produce a change in the susceptibility of materials to being etched by the plasma. This has definite benefits when one is processing temperature sensitive materials such as certain semiconductor devices or thermoplastic materials. In addition, a high degree of specificity is exhibited between the etching rate of differing organic materials permitting the use of certain convenient materials for masks.

Figure 2A:
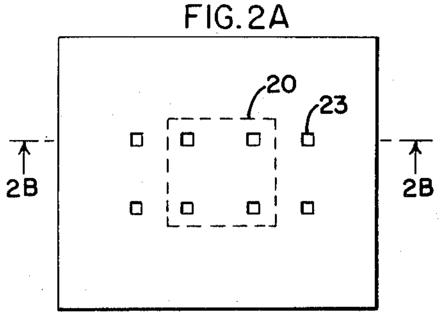
FIG. 2A is a plan view of a body member having an organic encapsulation member to be plasma etched having an apertured mask coated on the surface of the organic material.
Figure 2B:
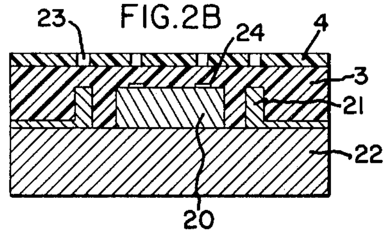
FIG. 2B is a cross sectional view of FIG. 2A taken along the plane 2B—2B.

In the plan view of FIG. 2A and the cross sectional view of FIG. 2B taken along the plane 2B—2B in FIG. 2A there is illustrated in greater detail the body member 1. This member is composed of an integrated circuit structure comprising a semiconductor chip 20 and metal electrodes 21 mounted on a dielectric substrate 22 and encapsulated by a cover layer 3 of organic material. Overlaying the organic layer 3 is a plasma etch mask 4 having apertures 23 aligned with the electrodes 22 and contact electrodes 24 on the chip. In the etch process the plasma attacks the organic layer 2 through the apertures 23, etching down to the metal electrodes. This permits electrical connections to be made between the electrodes 23 and 24.

In one preferred embodiment of the invention under consideration, the organic material was a fluorinated ethylene propylene, more commonly referred to as FEP Teflon. The plasma etch mask 4 may be composed of an inorganic metal such as aluminum, copper or any number of metals which will resist plasma attack. However, it is ordinarily more convenient to form the mask of an organic photoresist material, such as Shipley AZ-111, DuPont Riston or photopolymer Phodar, which are found to be relatively resistant to the generated plasma in contrast with the FEP Teflon. The photoresist mask is more desirable because a simpler fabrication process may be employed in applying the photoresist material onto the surface of the Teflon and etching apertures therein at precise points.

The coating process using the photoresist mask Shipley AZ-111, a positive photoresist material, may be performed as follows: The photoresist material is sprayed onto the surface of Teflon to a uniform thickness of about ½ mil. This has been done by successive coatings. After drying, the photoresist is exposed through a registered photomask to ultraviolet light, the photomask defining the pattern of apertures to be made in the photoresist layer. Since a positive photoresist material is being considered, the areas of the photoresist to be removed are exposed. Upon developing the photoresist in a suitable etch solution, the exposed areas are dissolved away down to the organic layer. Thus, the apertured photoresist mask is formed and the body member 1 prepared for the plasma etch process.

The etching process has had particular application in the creation of electrical interconnections between electrical terminals on a generally planar substrate. As previously indicated, the electrical terminals are disposed around the planar substrate and are covered by a thin layer of dielectric material. The etching process creates small holes immediately over the terminals and exposes the terminals for subsequent metallization steps. In these applications, the successive conductive and insulative materials are present in thin layers requiring carefully defined boundaries. The thickness of the dielectric layer requiring removal rarely exceeds a few thousands of an inch and the thickness of the conductive layers are usually slightly smaller. A thermoplastic material which has had very satisfactory electrical and mechanical properties for this application and which has been particularly susceptible to plasma etching has been fluorinated ethylene propylene. Other fluorinated polymers such as tetrafluoroethylene (TFE) exhibit the same etching susceptibility. A variety of materials have provided high resolution etching masks. The photoresist materials mentioned above are the most convenient for high resolution applications. These materials are also laid down in thin layers ordinarily on the order of a thousandth of an inch. Each of these materials appears to be much less susceptible to attack by the plasma than the fluorinated dielectric and therefore are particularly excellent for this application.

The reason for specificity in the etching rate as between the organic mask and the fluorinated dielectric appears to be based in part upon the specific plasma conditions resulting from the apparatus and operating conditions described above.

The chemical explanation applies to the family of fluorine saturated polymers on the one hand and to a quite heterogeneous family of organic solids on the other hand. The etching susceptibility of the fluorinated polymers appears to stem from the fact that the inner carbon bonds in the backbone of the fluorinated polymers are of relatively low energy in relation to the fluorine bonds to the carbon atoms themselves. Accordingly, when the plasma etching proceeds, the backbone is quite susceptible to attack and it proceeds to "unzip" the polymer chains and form gaseous reaction products. These gaseous reaction products are liberated into the vacuum and leave the situs of the reaction. This lesser susceptibility to plasma etching exhibited by a variety of organic solids in contrast to fluorinated polymers is shared by certain photoresists.

Photoresists are classes of materials used in photofabrication whose chemical nature is so altered as a result of exposure to light as to affect their subsequent solubility in a suitable liquid developer. They are classed as negative resists when exposure to light reduces the solubility of the exposed region in respect to the nonexposed regions. Positive resists exhibit the converse behavior, becoming more soluble to developer in exposed regions. The members of the class of negative photoresists may be laid down either as a dry film or as a liquid coating which later dries. The masks are then developed by an organic solvent such as xylene. The usual explanation of their light induced chemical change is that the material becomes cross linked or photopolymerized. A group of positive photoresists, such as AZO photoresists, after exposure appears to have a differential solubility to an acidic or caustic solution, the exposed region becoming thereafter more soluble. In the case of the Shipley positive photoresist, the development entails use of a mild caustic solution, exposure tending to form soluble acidic groups, Members of both classes of photoresists may be used to form masks. The dry film resists are particularly convenient in forming a continuous layer over an irregular underlayer and have been particularly successful.

As indicated, the mechanism for differential susceptibility appears to lie in the chemical differences between the photoresist and the FEP. Under controlled plasma attack it appears that subtle changes are made in a number of bonds within the photoresist as oxygen is substituted or radicals oxidized but the process is not accompanied by rapid physical deterioration. If the etching proceeds at high plasma densities, resistance of the photoresist to etching falls off very rapidly and the specificity of the etching process is reduced. However, if the etching proceeds in a carefully controlled manner which does not appreciably raise the temperature of the plasma or its density beyond the limits taught, the photoresist shows substantial immunity to attack by the plasma within the times required for removing the required thickness of FEP.

In accordance with the present invention, the photoresist may be passivated to become substantially immune to attack by the plasma at higher pressures than 100 microns.

When unpassivated photoresist materials such as Shipley AZ 111, DuPont Riston, of Photopolymer Phodar, are used as masks in the plasma etching process, it is found that these materials are removed by the plasma at approximately one-tenth to one-twentieth the rate that the FEP is removed (at pressures of about 100 microns). Because of this finite etch rate, it is necessary to increase the minimum mask thickness to insure that the mask not be removed in the time required to etch away the desired thickness of FEP. This minimum is in addition to the thickness normally provided as a precaution against gaps at the edges and around surface irregularities in initially depositing the resist over the substrate.

In the present process, however, it has been found possible to reduce the etch rate of the photoresist to a level where it is inconsequential and does not require an additional thickness allowance. In accordance with this second process, plasma etching is initiated at a pressure below 100 microns. The photoresist is exposed to the plasma at this pressure for a period of approximately 10 minutes to produce "passivation", by which is meant that the photoresist has been made substantially immune to further attack by the plasma. Thereafter the pressure may be increased to a value in the range of from 100 to 300 microns, suitable for optimum removal of the FEP.

After passivation in this manner, the mask is not affected by plasma even though the pressure of the plasma is now increased to a level where the etching rate would have been quite substantial for the unpassivated photoresist. When the passivated photoresist is examined, it may be seen to have darkened slightly and to exhibit a rather significant decrease in solubility to acetone. Since the passivation is accompanied by these physical changes, it appears that the result is in fact a chemical change. Once this has occured, the photoresist continues to retain its mechanical integrity while becoming immune to further attack by the plasma.

Passivation of the photoresist begins to occur in plasmas exceeding 50 to 60 microns. To hasten the passivation process, pressures in the vicinity of 85 microns but not exceeding 100 microns appear to be preferrable. Ordinarily passivation occurs within about ten minutes of exposure to the photoresist at a pressure of about 85 microns. If a pressure of 80 to 90 microns is used, passivation of the mask proceeds while the underlying FEP is being etched at a reasonable rate. These conditions provide a near minimum weight loss of mask material commensurate with a reasonable etching rate of the FEP. At above 100 microns the mask is etched away too rapidly for passivation. Assuming that the mask has been initially passivated at a pressure in the range of from 80 to 90 microns, one may continue the etching process at a pressure below 100 microns without the mask being further attacked. Since the mask is now resistant to the plasma at higher gas pressures, however, one may now increase the gas pressure above 100 microns to increase the rate of removal of the FEP. When the pressure is substantially increased, the sample should also be relocated with the plasma for optimum etching.

With the mask passivated in this means it is possible to reduce the thickness of the mask to a smaller minimum consistent with achieving a continuous coating over the dielectric layer. Consequently, since thinner layers of resist may be used and since a higher plasma pressure may be used during much of the etching process, passivation permits more rapid and more uniform processing.

One specific embodiment of a plasma reaction chamber 30 such as may be employed in FIG. 1, is illustrated in the partially broken away perspective view of FIG. 3. The chamber 30 includes a tubular glass structure 31 having a middle flat region of rectangular configuration. An organic body member 32 overlayed by an apertured mask 33 is mounted within the tube 31 on a dielectric plate 34. The masked surface is spaced from the tube inside surface by in the order of 75 mils to ¼ inch, this distance being adjusted for providing an optimum plasma etch as earlier described for different organic samples. A metal electrode 35, in a specific example aluminum, contacts the top surface of the glass tube 31. At one end the tube is sealed to a metal rim 36 having an input port 37 for introducing an oxidizing gas into the tube. A hinged door 38 is sealed by an O-ring 39 to the metal rim 36. The opposite end of the tube 31 is sealed to a metal rim 40 having an output port 41 for carrying away the reaction products of the plasma etch process. The rims 36 and 40 are connected to ground so that a dielectric field is applied between the electrode 35 and rims 36 and 40. The electric field generates an intense plasma in the region below the electrode 35 and above the body member 32 which plasma etches the organic material through the apertured mask 33.

What is claimed as new and desired to be secured by Letters Patent of the United States is:

1. A method for selective plasma etching of an organic layer comprising:

a. applying an apertured mask of organic photoresist over the surface of said organic layer, said organic layer being a fluorinated polymer, b. placing the member bearing said organic layer in a vacuum chamber, c. providing a flow of gas over said layer suitable for forming a plasma, d. establishing a large magnitude alternating electric field for exciting said gas to form a low temperature etching plasma with said chamber, and e. maintaining said gas at a pressure in the range of from 60 to 100 microns of mercury until further removal of said organic photoresist is substantially terminated, said pressure being increased after passivation of said photoresist to within the range of from 100 to 300 microns of mercury.

2. The method set forth in claim 1 wherein said pressure during passivation is approximately 85 microns of mercury and said gas is oxygen.

3. The method as set forth in claim 1 wherein said photoresist is a negative working dry film photoresist.

4. The method set forth in claim 1 wherein said photoresist is a positive working photoresist.

* * * * *